US011770390B2

(12) United States Patent
Vaswani et al.

(10) Patent No.: US 11,770,390 B2
(45) Date of Patent: *Sep. 26, 2023

(54) CONTEXT-AWARE NETWORK-BASED MALICIOUS ACTIVITY WARNING SYSTEMS

(71) Applicant: Palantir Technologies Inc., Palo Alto, CA (US)

(72) Inventors: Akash Vaswani, Menlo Park, CA (US); Asavari Sinha, New York, NY (US); Gautam Punukollu, New York, NY (US); Kyle McLain, Royal Oak, MI (US); Vivian Yu, Seattle, WA (US)

(73) Assignee: Palantir Technologies Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/817,828

(22) Filed: Aug. 5, 2022

(65) Prior Publication Data

US 2022/0377090 A1    Nov. 24, 2022

Related U.S. Application Data

(63) Continuation of application No. 16/904,944, filed on Jun. 18, 2020, now Pat. No. 11,411,971, which is a continuation of application No. 15/796,529, filed on Oct. 27, 2017, now Pat. No. 10,728,262.

(60) Provisional application No. 62/437,250, filed on Dec. 21, 2016.

(51) Int. Cl.
*H04L 9/40* (2022.01)
*G06F 3/0482* (2013.01)

(52) U.S. Cl.
CPC ...... *H04L 63/1416* (2013.01); *H04L 63/1433* (2013.01); *G06F 3/0482* (2013.01)

(58) Field of Classification Search
CPC ............ H04L 63/1416; H04L 63/1433; G06F 3/0482; G06F 21/554; G06F 21/62
See application file for complete search history.

(56) References Cited

U.S. PATENT DOCUMENTS

| | | | |
|---|---|---|---|
| 9,100,428 B1 * | 8/2015 | Visbal | ..................... H04L 63/14 |
| 10,530,790 B2 | 1/2020 | Shih et al. | |
| 10,721,262 B2 | 7/2020 | Zorlular et al. | |
| 10,728,262 B1 | 7/2020 | Vaswani et al. | |
| 11,283,829 B2 | 3/2022 | Zorlular et al. | |

(Continued)

*Primary Examiner* — Baotran N To
(74) *Attorney, Agent, or Firm* — Knobbe, Martens, Olson & Bear, LLP

(57) ABSTRACT

A computer system is configured to generate alerts related to malicious activity on an audited computing system. The computing system is provided with instructions to receive activity information associated with activity of an entity performed in an audited computing network, access contextual information associated with the entity, determine, based on the contextual information, a set of weights associated with the activity information and combine the weight and the entity activity information to generate a risk score. In response to the risk score satisfying a threshold value, the computer system may generate an alert, and, in response to receiving a user input associated with the alert, update the set of weights. In certain embodiments, the updated weights may be used for determining the risk score of future alerts.

20 Claims, 8 Drawing Sheets

(56) References Cited

U.S. PATENT DOCUMENTS

| | | |
|---|---|---|
| 11,411,971 B2 | 8/2022 | Vaswani et al. |
| 11,637,854 B2 | 4/2023 | Zorlular et al. |
| 2015/0121518 A1* | 4/2015 | Shmueli ............. H04L 63/1425 |
| | | 726/22 |
| 2016/0094577 A1* | 3/2016 | Shih ....................... H04L 63/10 |
| | | 726/25 |
| 2016/0226905 A1* | 8/2016 | Baikalov ............. H04L 63/1433 |
| 2018/0083950 A1 | 3/2018 | Cicchitto et al. |
| 2020/0265357 A1 | 8/2020 | Vashistha |
| 2022/0174088 A1 | 6/2022 | Zorlular et al. |

\* cited by examiner

| Indicators | Entity Roles | | |
|---|---|---|---|
| | Sales | Software Development | Legal Department |
| New Grant of Access Privileges | 0.28 | 0.45 | 0.45 |
| Prior Policy Violations by Entity | 0.28 | 0.255 | 0.255 |
| Prior Policy Violations by Department | 0.25 | 0.15 | 0.15 |
| Associated with Competitor | 0.2 | 0.2 | 0.2 |
| Multiple Authentication Failures | 0.175 | 0.01 | 0.15 |
| Previously Escalated | 0.25 | 0.25 | 0.25 |
| DLP: Personal Confidential Information | 0.05 | 0.05 | 0.005 |
| DLP: Source Code | 1 | 0.015 | 0.5 |
| Data Exfiltration - Proxy (MB Transferred) | 0.003 | 0.003 | 0.003 |
| Data Exfiltration - Removable Media (MB) | 0.002 | 0.0005 | 0.001 |
| Data Exfiltration - Print (Pages Printed) | 0.005 | 0.01 | 0.001 |

FIG. 4

| Alerts | × | |
|---|---|---|
| ← C | https://example.com | ☆ ☰ |

[Take Action] [×]

Viewing Feedback:

Max Holmes
2016/10/15
Entity has been referred to Technology Department for Review.

1239  Marketing Team 3  [OPEN]

Triggered By  Date Triggered  Assigned To  Watched By
Data Exfiltration: 2016/10/14 12:01  Max Holmes  Ben Greene
Associated with Competitor

| Summary | DLP | Exfil | History |
|---|---|---|---|

Historical Incidents

| Policy | Incidents | Entity Pass % | Dept Pass % | Rule Pass % |
|---|---|---|---|---|
| Data Exfiltration | 5 | 20 | 60 | 98.11 |

1321  1322  1324  1326  1328

Timeline  1325

2016-09-18  1:42 AM   Data Exfiltration - Source Code
                       Email with 12MB to exposure@leakwebsite.com
2016-09-17  2:11 AM   Data Exfiltration - Personal Confidential Information
                       50 Page Print-out on Laser Printer 1
2016-10-01  2:22 AM   Data Exfiltration - Financial Data
                       HTTP Upload of 10MB to leakwebsite.com

CONTEXT-AWARE NETWORK-BASED MALICIOUS ACTIVITY WARNING SYSTEMS

CROSS-REFERENCE TO RELATED APPLICATIONS

This application is a continuation of U.S. patent application Ser. No. 16/904,944, filed Jun. 18, 2020, and titled "CONTEXT-AWARE NETWORK-BASED MALICIOUS ACTIVITY WARNING SYSTEMS," which application is a continuation of U.S. patent application Ser. No. 15/796,529, filed Oct. 27, 2017, and titled "CONTEXT-AWARE NETWORK-BASED MALICIOUS ACTIVITY WARNING SYSTEMS," which application claims benefit of U.S. Provisional Patent Application No. 62/437,250, filed Dec. 21, 2016, and titled "CONTEXT-AWARE NETWORK-BASED MALICIOUS ACTIVITY WARNING SYSTEMS." The entire disclosure of each of the above items is hereby made part of this specification as if set forth fully herein and incorporated by reference for all purposes, for all that it contains.

Any and all applications for which a foreign or domestic priority claim is identified in the Application Data Sheet as filed with the present application are hereby incorporated by reference under 37 CFR 1.57 for all purposes and for all that they contain.

TECHNICAL FIELD

The present disclosure relates to systems and techniques for data integration, analysis, and visualization. More specifically, systems and methods are disclosed that facilitate the generation and presentation of alerts relating to malicious activity, as may, for example, occur by entities on a computer network. Furthermore, systems and methods are disclosed for the collection and processing of responses from a human auditor to such alerts.

BACKGROUND

Embodiments of the present disclosure generally relate to data processing and visualization.

Various entities on an organization's computer system and network may access computer resources, such as a computer system, a network, or data that can be accessed through the computer system or network, in ways that the organization wishes to permit ("benign activity"), as well as in ways the organization seeks to prevent ("malicious activity"). Entities that may be present on a computer network include computers, automated programs, and human users, among others. In many circumstances, granting the entity the requisite access rights necessary to conduct benign activity implies granting the entity access rights sufficient to conduct malicious activity. For example, malicious activity may take place by the entity copying confidential information off the computer system ("data exfiltration"), such as by a user e-mailing confidential information to an external recipient, by storing it on a portable medium, or by making print-outs.

SUMMARY

The systems, methods, and devices described herein each have several aspects, no single one of which is solely responsible for its desirable attributes. Without limiting the scope of this disclosure, several non-limiting features will now be discussed briefly.

As mentioned above, granting an entity the requisite access rights necessary to conduct benign activity may require granting the entity access rights sufficient to conduct malicious activity. It may be hard to distinguish malicious activity from benign activity. For example, an entity such as a computer program may "crawl", or systematically download, a confidential database. Such an act could merely be an indication of a benign indexing process done to allow efficient searching of the database. Such an act may also indicate that malicious duplication of the database, for example to steal proprietary information, may be in progress. As another example, an entity may print-out confidential documents for further human review, thus engaging in benign activity. At the same time, the entity's act of printing the documents may be in preparation for exposing them to the public online, thus representing malicious activity. As such, there remains a need for novel systems and methods assisting with identifying malicious activity, presenting alerts related to suspected malicious activity in a way that is comprehensible and accessible to a human auditor, and collecting and processing responses from a human auditor to such alerts in order to inform future investigations of suspected malicious activity.

Various different types of records and information may be indicative of malicious activity. For example, an entity's activity records on a computer network may be an indicator of an entity's malicious activity. For example, the extent to which a remote computer has previously attempted to access resources beyond its authorization may be indicative as to whether that remote computer is facilitating malicious activity. Similarly, an entity's past transaction history may be an indicator of that entity's malicious activity. For example, whether a remote device has previously been flagged for potentially malicious activity, whether a certain program has access to particularly sensitive information, or what department or organizational unit a server is operated by may indicate whether such a device, program or server is presently engaged in malicious activity. As another example, an entity's prior policy violations, role in an organization, or level of access to sensitive information may be other indicators of malicious activity. For the purpose of the present disclosure, any such information shall be termed an "indicator of malicious activity", or simply an indicator. An indicator may include any data, information, or things, such as an activity, an event, an transaction history, an employment history, and/or the like.

An indicator, viewed in isolation, does not necessarily confirm or deny that an entity is engaged in malicious activity; rather, an indicator may be probative, even if only slightly so, by virtue of being positively or negatively correlated with malicious activity. For example, the fact that an entity has only recently been granted access to confidential information, for example that a workgroup has recently been granted additional access privileges in an organization, will, viewed in isolation, not justify a conclusion that this entity is engaged in malicious activity. Viewed together with other indicators, however, knowledge of this fact may assist in determining whether or not such entity is engaged in malicious activity.

Embodiments of the present disclosure relate to a warning system that may automatically collect indicators, automatically analyze those indicators to generate alerts, automatically tag, score and group those alerts, and provide results of the automated analysis, tagging and grouping in an optimized way to an auditor. The automated analysis of the indicators may include an automated application of various criteria or rules so as to generate a visual display of the groups of related indicators so that the auditor may quickly and efficiently evaluate the alerts. In particular, the indicators may be dynamically re-grouped and/or filtered in an interactive user interface so as to enable an auditor to quickly navigate among information associated with various alerts and efficiently evaluate the groups of alerts in the context of, for example, an audit for data breach or other malicious activity. Embodiments of the present disclosure also relate to automated scoring of the alerts. The interactive user interface may be updated based on the scoring, directing the human auditor to certain alerts (for example, alerts more likely to be associated with malicious activity) in response to the auditor's inputs. Embodiments of the present disclosure also related to automated updating of the scoring method based on past findings. For example, if an auditor determines that an alert generated on the basis of a certain indicators was a false positive, the influence of these indicators in the alert scoring process may be reduced for future alert scoring. Conversely, if an auditor determines that an alert was issued that indeed should have been issued, the influence of the indicators present in the alert in the alert scoring process may be increased for future alert scoring.

An auditor's effectiveness in detecting malicious activity and evaluating alerts may be greatly enhanced if the auditor is presented with indicators that are contextually related to the activity being audited, or the alert being evaluated. In an example application, an auditor may be tasked with deciding whether the presence of a certain indicator represents malicious activity. However, an individual indicator oftentimes includes insufficient information for the auditor to make such decisions. Rather, the auditor may make better decisions based upon a collection of related indicators. For example, an entity's act of duplicating a single customer file may be insufficiently probative for the auditor to infer any malicious activity. Conversely, if the auditor is able to see that the same entity is systematically creating duplicates of the entire customer database, the auditor may see a pattern of malicious activity.

An auditor's effectiveness in detecting malicious activity and evaluating alerts may further be enhanced by the auditor being presented with aggregates, such as totals, counts and averages, calculated from several indicators. For example, an auditor reviewing whether a certain entity's act of transferring confidential documents to a recipient, such as a remote server, outside of the organization represents malicious activity may make better decisions when presented with information regarding prior, similar activity by the entity, the department responsible for the entity, department or the entity's organization.

Additionally, an auditor typically does not have the time and resources to review all activity by all entities. As such, it is advantageous that auditing resources are concentrated on the activities most likely to constitute malicious activity. Some embodiments of the present disclosure perform scoring based on an estimate of the likelihood that a certain alert is related to malicious activity to decide whether to present an alert to an auditor, and how to present the alert. The scoring is based on a mapping between each indicator and an estimate of the likelihood that the indicator is indicative of malicious activity. Such a mapping is referred to as the "weight" of the corresponding indicator.

The types of benign activity and malicious activity and their relevance may change over time and may not be known accurately. As such, in some embodiments, the warning system updates the weights of indicators to reflect an auditor's determination as to whether or not the issuance of a given alert was justified. For example, in an embodiment, if an auditor determines that a given alert was issued despite the absence of malicious activity, the weights associated with the indicators based on which the alert was issued will be reduced. This allows the warning system to learn from past alerts, improving its prediction accuracy over time. To ensure that the warning system does not unduly filter out emerging patterns of malicious activity for which the existing weights are not optimal, and thus prevent the system from becoming error-prone due to self-reinforcement bias, a random offset value may be added during the filtering process to introduce an element of chance into the warning system's decision of whether an alert is displayed or not. Similarly, in another implementation, alerts with various scores may be randomly displayed to the auditor for the same purposes.

Some currently available systems allow the auditor to search for and review individual indicators. Although these currently available systems can be helpful in discovering indicators for known types of malicious activity, they typically require the auditor to manually repeat the same series of searches to determine related indicators, to manually calculate aggregates where the auditor desires to use them, and to manually go through large amounts of irrelevant data to find relevant indicators contained therein. Performing and continuously repeating these manual processes consumes time and resources, such that there are oftentimes more investigations than can be performed.

In contrast with these currently available systems, and as described above, according to various embodiments, the warning system of the present disclosure automatically collects indicators from a variety of sources, analyzes the indicators to generate alerts, tags and groups the alerts, and generates an interactive user interface in which, in response to inputs from the auditor, information related to the alerts and relevant indicators may be efficiently provided to the auditor. Accordingly, the auditor may be enabled to efficiently evaluate the alerts.

Additionally, the automated scoring of alerts (as mentioned above) may enable highly efficient evaluation of the most relevant alerts by an auditor. For example, the interactive user interface is generated so as to enable an auditor to quickly view critical groups of alerts (as determined by the automated scoring), and then in response to auditor inputs, view and interact with the generated information (including, for example, time-based charts and/or other information) associated with the alerts. In response to user inputs, the user interface may be updated to display raw data associated with each of the generated alerts and its corresponding indicators if the auditor desires to dive deeper into data associated with a given alert.

Further, as described herein, a warning system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

It has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The various embodiments of interactive and dynamic user interfaces of the present disclosure are the result of significant research, development, improvement, iteration, and testing.

This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for an auditor using the system.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components (for example, retrieval of indicators), automatic and dynamic execution of complex processes in response to the input delivery (for example, grouping, filtering and scoring of alerts), automatic interaction among various components and processes of the system, and/or automatic and dynamic updating of the user interfaces. The interactions and presentation of data via the interactive user interfaces described herein may accordingly provide cognitive and ergonomic efficiencies and advantages over previous systems.

Advantageously, according to various embodiments, the disclosed techniques provide a more effective starting point and user interface for an investigation of potentially malicious activity of various types. An auditor may be able to start an investigation by responding to alerts generated by the system that are generated based on an empirically determined estimate of likelihood of malicious activity. This may focus the auditor's attention on reviewing activity that has historically proven to be problematic. As such, it may reduce the amount of time and effort required to perform the investigation. The disclosed techniques may also, according to various embodiments, provide a prioritization of multiple alerts related to potentially malicious activity, dynamic re-grouping of such alerts, and alert filtering. For example, the auditor may also be able to start the investigation from a high priority group of alerts, which may allow the auditor to focus on the most important investigations, and may quickly evaluate that group of alerts based on the efficient user interface generated by the system. In each case, the time requirements of such an investigation may be significantly reduced due to the creation and use of highly efficient representations, including visual representations such as graphs, and aggregate quantities, such as totals, counts, and averages, of related indicators.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

FIG. 4 illustrates an example weight table, according to an embodiment of the present disclosure.

FIG. 7 illustrates an example warning system user interface displaying details of the history information related to an alert, according to an embodiment of the present disclosure.

DETAILED DESCRIPTION OF SPECIFIC EMBODIMENTS

Figure 1:
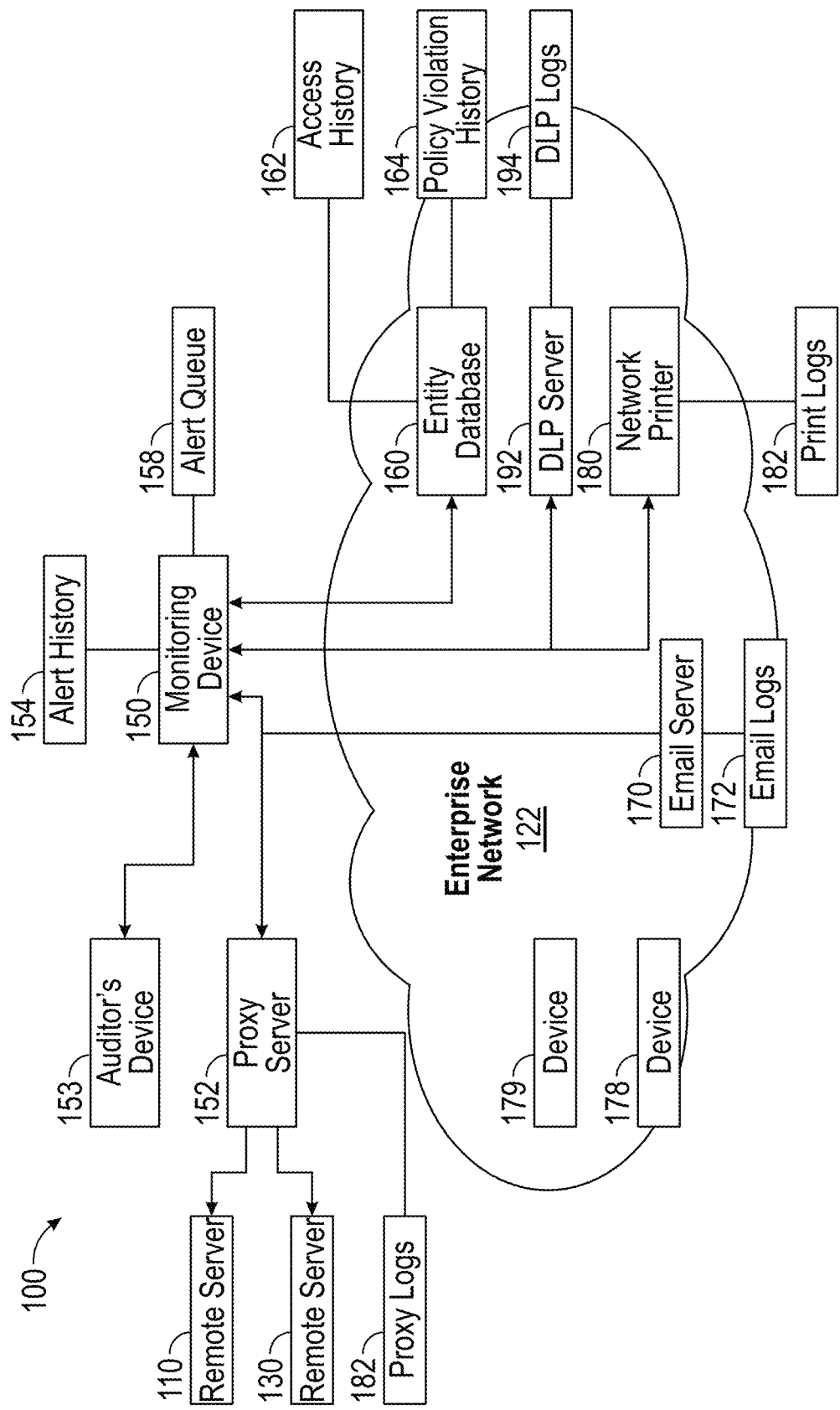
FIG. 1 is a block diagram illustrating an example warning system in an example operating environment, according to an embodiment of the present disclosure.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Terms

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Entity: Any actor interacting with a computer network, for example by transmitting or receiving data. Examples of entities may include automated programs (e.g., spiders or crawlers, software programs, etc.), remote or local computers or other devices (e.g., internet hosts, servers, routers, etc.), workgroups and teams, individual users, and the like.

Entity activity information: Any information related to an entity's activity on a computing system or network. Such entity activity information may include, for example, computer logins and logouts, data inputted, data transferred, data changed or modified, data created, data outputted, data printed, IP addresses communicated with, websites communicated with, software applications executed, etc. Entity activity information may be gathered by hardware appliances or computing devices located within a network or computing system, software applications located within a network or computing system, and/or any other suitable methods. For example, entity activity information may be stored in proxy logs, data loss prevention (DLP) logs, email server logs etc.

Contextual information: Any information about the entity and its environment, such as the entity's organization, the entity's department, the entity's access privileges, and the entity's relationships within an organization or computer network, etc. Contextual information may include the entity's roles and responsibilities in the organization, the entity's history of benign activity or malicious activity, the entity's history in the organization, the duration of the entity's authorization to access resources within the organization, whether some individuals related to the entity have has expressed an interest in leaving the organization, whether the entity has unsuccessfully attempted to log into other computer resources, whether the entity has access to particularly sensitive information and whether the entity's department has previously engaged in malicious activity, etc.

Data exfiltration: Unauthorized removal of information (e.g., confidential information) from the control of the organization. Data exfiltration may be accomplished by an entity, for example, through an automated program systematically transmitting proprietary information to a web server or other type of storage outside the control of the organization, by copying confidential information to a removable drive, by uploading confidential information to a web server, by emailing confidential information to a recipient outside the organization, etc.

Malicious activity: An activity of an entity that an organization perceives as undesirable, such as, for example, data exfiltration.

Benign activity: An activity of an entity that an organization perceives as desirable, such as activity pursuant to an entity's purpose within the organization.

Indicator: Any type of record or information that may indicative the presence or absence of malicious entity activity. For example, entity activity information associated with an entity of a computer network may be an indicator, as may contextual information associated with the entity, such as the entity's prior transaction history, its role in an organization, or its level of access to sensitive information. An indicator may include any data, information, or things, such as an activity, an event, an access log, records related to the type and duration of an entity's past history and/or the like. In some implementations, indicators may be compared to one or more rules that may be predefined in the system, and that may be executed by a rules engine or processor of the system, to identify malicious activity.

Alert: A notification from a warning system that potentially malicious activity was detected.

Flags: One or more indicators that are used, individually or in aggregate, to group, categorize or filter alerts. For example, in an example embodiment, some of the predefined flags are an entity's access to confidential information, an entity's status as a repeat offender of an organization's computing policies, and an entity's status as having its access privileges recently granted or expanded. Using suitable indicators as flags allows the auditor to filter the alerts shown to only include alerts in which the selected flags are present. This may be advantageous, as the auditor may efficiently and with minimal mental effort show only alerts exhibiting certain flags, and thus more easily recognize patterns of malicious entity activity.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, MySQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

Example Warning System and Network Environment

FIG. 1 is a block diagram illustrating an example warning system in an operational (e.g., network) environment 100, according to an embodiment of the present disclosure. As shown in the embodiment of FIG. 1, the warning system comprises a monitoring device 150, which is connected to an enterprise network 122 and stores an alert queue 158 and an alert history 154. The enterprise network is connected to an auditor's device 153, an email server 170, an entity database 160, a network printer 180, a DLP server 192, and a proxy server 152. The enterprise network 122 is connected to various remote servers, such as remote servers 110 and 130, optionally through the proxy server 152. The entity database 160 stores data related to access history 162 and policy violation records 164. The email server 170 stores email logs 172. The DLP server 192 stored DLP logs 194. The monitoring devices may store an alert history 154, comprising previous alerts generated by the warning system and data related to such previous alerts. The enterprise network is also connected to one or more devices 178, 179. The devices 178, 179 may have permissions to access various resources available on the enterprise network 122. For example, the devices 178, 179 may be able to send print jobs to a network printer 180 and utilize the email server 170 to send and receive emails. The devices may be able to establish connections to remote servers 110, 130 through the proxy server 152. In various embodiments, devices 178, 179 may comprise any other suitable entity engaging in activity in the network environment 100, including, for example, devices accessible to a general audience, such as kiosks, or devices accessible to specific users.

The activities of the devices 178, 179 may be logged and recorded at various locations in the enterprise network. For example, the devices' 178, 179 access to remote servers 110, 130 may be recorded by the proxy server 152 in the proxy logs 182. The devices 178, 179 may be running Data Loss Prevention (DLP) software that stores and sends to the DLP server information about certain acts in violation of a company's DLP (data loss prevention) policy, such as copying of data onto a removable storage medium. The DLP server may include this information in the DLP logs 194.

The entity database 160 makes available to the monitoring device 150 information about the entities and their environment through the enterprise network 122. The entity database 160 makes available information about entities' policy violation records 164, and entities' access history 162. In an example embodiment, the entity database may be a MySQL or MSSQL database comprising various tables. The access history 162 may be a table, comprising different columns, for example, the date an entity first had access to the enterprise network 122, an entity number, the department responsible for the entity, an individual responsible for the entity, an entity's role in the organization, and other information. The policy violation records 164 may be a table, comprising a row for each violation of organizational policy by an organization's policy, such as a computing policy, and storing information about the type of violation and any action taken in various columns. For example, a column may contain the entity number of the entity by which a violation was observed, the date a violation was observed, whether any action was taken, the type of action, remarks and other information. For example, if a certain entity has been The email server is responsible for routing email messages originating from the enterprise network 122 to their recipients. During operation, the email server creates email logs 172, and makes the email logs 172 available to the monitoring device 150. For example, the email logs 172 may comprise indicators relating to what messages were sent by entities on the enterprise network 122, who the recipients of these messages were, and what type of data attachments were contained in the message.

A network printer 180 may also be connected to the enterprise network 122. The network printer 180 may create print logs 182 in the course of its operation, and make the print logs 182 available to the monitoring device 150 through the enterprise network 122. The print logs 182 may comprise indicators related to what print jobs were started, which entities were involved in starting each print job and from what computer it was sent, how many pages each print job was, and what the type, file name and file type of the printed document was.

A Data Loss Prevention (DLP) server 192 may also be connected to the enterprise network 122. The DLP server may provide DLP logs 194, which may comprise indicators related to an entity's transfers of files from the enterprise network 122 to removable media (such as a USB flash drive), an entity's transfers of files and/or communications within and/or outside of the enterprise network 122, and/or other entity activities. For example, if a computer is infected with malicious software which seeks to exfiltrate data from the computer through the internet, or if an entity, such as an automated program or a user, copies files from a personal computer to removable media, the DLP server may contain indicators related thereto. The DLP server may, for example, be any commercially available or open-source DLP solution, including, for example, Symantec DLP or McAfee Total Protection DLP.

The monitoring device 150 may also access logs and other activity information from sources in addition to the ones illustrated here. For example, the monitoring device 150 may access operating system logs of various computer systems, such as are provided by syslog or Windows Event Log. The monitoring device 150 may also access service logs that may be generated by a variety of services, such as a web server, database server, voice over IP server, during operation. The monitoring device 150 may also access logs from various other devices such as manageable switches, Uninterruptible Power Supplies (UPSs), hardware firewalls, wireless access points, intrusion detection systems (IDSs), etc.

In various embodiments, the warning system may be configured in various ways that differ from the example configuration of FIG. 1. For example, one or more aspects described in reference to FIG. 1 may not be present, and/or additional aspects may be present, in any given implementation of the system. Thus, while different types of entity activity information and contextual information may be available in different implementations, the warning system described herein may nevertheless function similarly, and all such implementations are contemplated.

Accordingly, as mentioned, in various embodiments the monitoring device is configured to collect and analyze a variety of indicators, and generate alerts based on the result of the analysis. For example, the monitoring device may receive email logs 172, proxy logs 182, DLP logs 194, policy violation records 164, entities' access history 162, and/or various other indicators.

Example Method of Alert Generation

Figure 2:
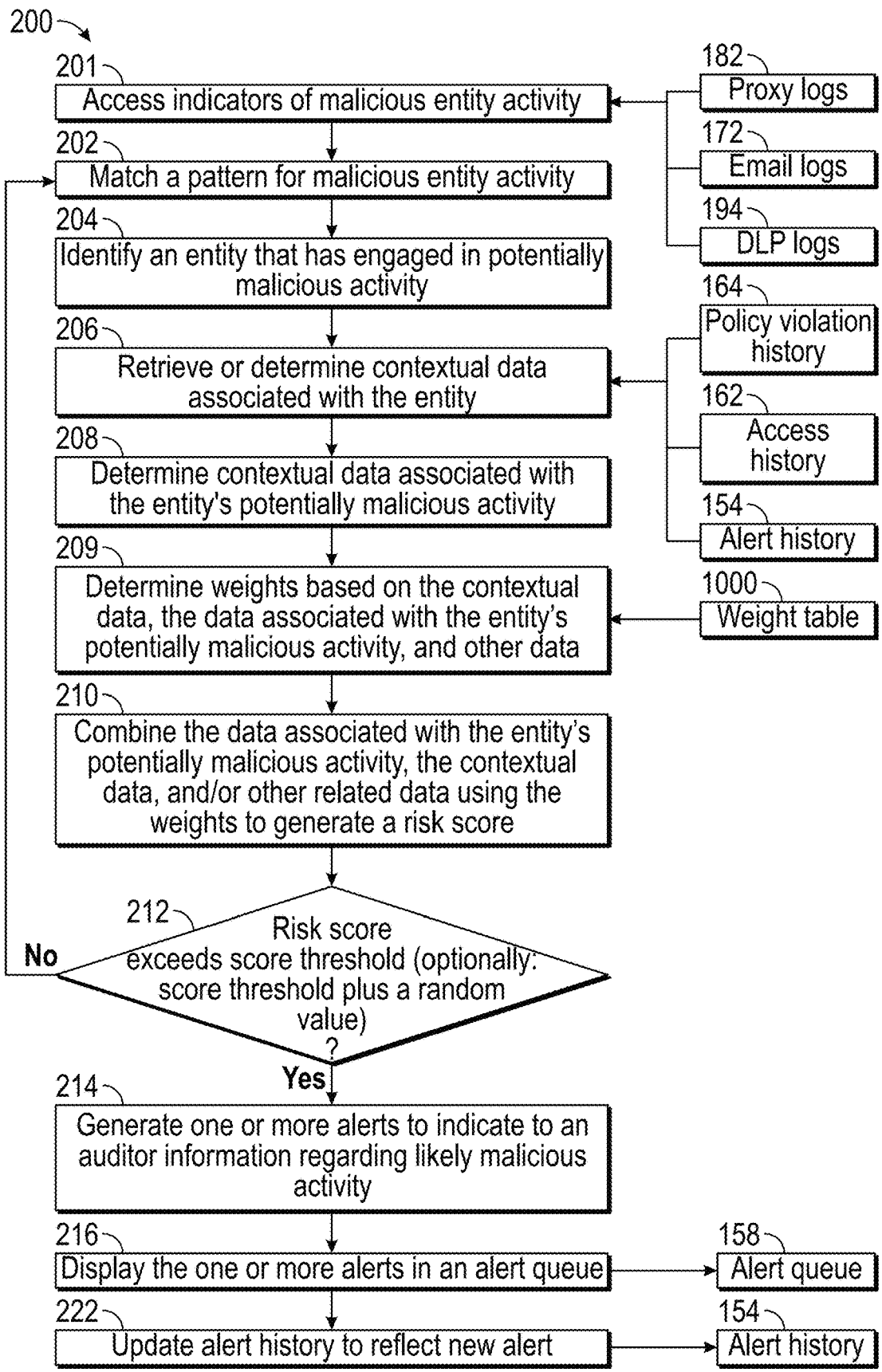
FIG. 2 is a flow chart illustrating an example generation of alerts by the warning system, according to an embodiment of the present disclosure.

FIG. 2 is a flowchart of an example method 200 of alert generation, according to an embodiment of the present disclosure. In various embodiments, fewer blocks or additional blocks may be included in the process of FIG. 2, or various blocks may be performed in an order different from that shown in the figure. In various implementations, the block of FIG. 2 may be performed serially and/or concurrently, and may be performed multiple times simultaneously. Further, one or more blocks in the figure may be performed by various components of the warning system, for example, monitoring device 150 (described above in reference to FIG. 1).

At block 201, the warning system begins its analysis by accessing indicators of malicious activity. Examples of such indicators include proxy logs 182, email logs 172, DLP logs 194, print logs 182, and any other entity activity information. In an embodiment, the warning system may be configured to begin the analysis on a periodic schedule. In another embodiment, the warning system may begin the analysis upon demand by an auditor. The warning system may, for example, access the indicators by querying other devices through a network management protocol, such as SNMP, gather the information from accessing the file system of a remote device and parsing its log files, or by processing other types of logs such as packet captures from a firewall, intrusion detection system or gateway. In an embodiment, the warning system may copy the indicators into local storage for faster analysis.

At block 202, the system matches the indicators accessed in block 201 against a set of rules that correspond to potentially malicious activity. The rules may be specifically written for the organization and its procedures, or may be generic rules. For example, indicators from an email server may be matched against a set of rules to determine indicators related to emails that were sent to a recipient outside the organization. Proxy logs 182 may be compared against a list of known domains to determine uploads of confidential information from inside the organization to an outside web server. Print logs 182 may be matched against a set of rules to determine pages containing confidential information being printed. DLP logs 194 may be matched against rules to determine indicators related to removal or duplication of files to storage outside the control of the organization (e.g., copying files to removable media).

At block 204, the warning system identifies an entity that, based on the result of the analysis in 202, has engaged in potentially malicious activity. For example, the warning system identifies a device, server, or department which is shown by indicators contained in the email logs 172 to have sent confidential information to outside recipients, thus having engaged in activity that could potentially constitute malicious activity.

In block 206, the warning system accesses additional indicators from contextual data associated with the entity identified in block 204, including, for example, policy violation records 164, an entities' access history 162, an alert history 154, and/or the like. For example, the system may access the entity's access history to determine how long the entity has held permission to access resources of the organization, what the entity's role in the organization is, and whether the entity has access to particularly sensitive information. The system may access the entity's policy violation history to determine whether other indicators of malicious activity, such as previous violations of company policy, are present.

In block 208, the warning system accesses additional indicators from contextual data associated with the entity's potentially malicious activity, including, for example, historical data regarding past, similar alerts. For example, the system may access information pertaining to how many similar alerts were issued in the past for the entity, the entity's department and the organization as a whole, and how many of such alerts were subsequently dismissed by an auditor. Advantageously, this allows the system to take into account empirical data related to past alerts from similar indicators, and thus allows the system to make a more accurate estimate of risk by comparing the suspicious conduct to that of a representative group, such as the entity's department or organization. In some embodiments, an indicator may be excluded from future analysis altogether based on the contextual data associated with the entity's potentially malicious activity. For example, if the indicator is sufficiently similar to an entity's activity for which an alert has previously been generated and subsequently dismissed by an auditor, this indicator may be excluded. As a further example, in an embodiment, if an auditor has previously dismissed an alert relating to an indicator related to data exfiltration through e-mail by a specific entity, this indicator will no longer contribute to the risk score for an alert related to that entity. In an alternative embodiment, the contribution to the risk score may be reduced by adjusting the weights appropriately. Advantageously, this ensures that the auditors are not repeatedly presented with alerts related to the same activity by a certain entity and thus discourages the auditors from falling into a habit of dismissing alerts without appropriately reviewing them first.

In block 209, the warning system accesses a weight table (or matrix) 1000 to determine a set of weights for scoring the indicators, based on the contextual data, the data associated with the entity's potentially malicious activity, and/or other data. The weight table represents a set of weights mapping each indicator to a weight. The set of weights may be determined at least in part based on the entity's role in the organization, and/or other contextual information associated with the entity. In an embodiment, the warning system may have different sets of weights for each entity role. For example, it may be advantageous to use a separate set of weights for an entity who is assigned the role of "source code review", as opposed to "sales", reflecting that a computer, department or individual who is tasked to work with source code is acting more closely related to his role when, for example, copying such source code, and thus less likely to be engaged in malicious activity than an entity assigned to a sales department copying the same source code. The weight table 1000 is further described below in reference to FIG. 4.

In block 210, the warning system combines the indicators and contextual data determined in, for example, blocks 202, 206, and/or 208 into a risk score. The risk score may be viewed as the warning system's estimate that a certain entity's activity is malicious activity. In an embodiment, the risk score is determined by multiplying the value of each indicator with the corresponding weight from the chosen set of weights, and summing up the results. In other implementations the risk score may be determined according to any other suitable aggregation of the indicators. As an example, an entity may be assigned a role of "Legal Department", and the entity may display the indicators "New Access Privileges", "Multiple Authentication Failures" and "Data Exfiltration—Removable Media". If the weight table as shown in FIG. 4 is used, the warning system may calculate the user's risk score as SCORE=0.45+0.15+0.001=0.601, SCORE=0.45*(A value assigned to or based on the New Access Privileges indicator)+0.15*(A value assigned to or based on the Multiple Authentication Failures indicator)+ 0.001*(A value assigned to or based on the Data Exfiltration-Removable Media indicator), and/or another suitable calculation/aggregation.

In block 212, the system compares the risk score to a threshold value and determines whether the risk score exceeds the threshold value. In an embodiment, the threshold value represents the lowest score that the auditors should always see a corresponding alert for. In some embodiments, the threshold value may be adjusted based on the number of alerts in the queue, so as to discard less critical alerts when the queue gets full. This may be advantageous so as to ensure that the auditors are not overwhelmed with vast quantities of alerts that they may not have sufficient time to review. Optionally, a random offset may be added to the risk score before it is compared to the threshold value, and/or a random offset may be applied to the score threshold. Advantageously, this allows for lower-scoring alerts to have some chance of being surfaced. This thus allows malicious activity that the current weight table may not adequately capture otherwise, being given a probability of being surfaced, eventually leading to an adjustment of the weights and thus an opportunity for the warning system to adjust to changing patterns of benign activity or malicious activity. For example, if the weight table 1000 is chosen so that the risk score lies in a range from 0 to 100, the threshold value may be set at 50, and a number chosen from an interval between 0 and 30 may be used as the random offset. This choice of parameters will ensure that all alerts with a risk score of more than 50 will always be shown, so that presentation of the most critical alerts does not depend on chance. It will also ensure that alerts with a risk score lower than 20 will never be shown. Between the risk scores of 20 and 50, the alerts will have a probability of being shown that is linearly dependent on their risk score. This means that some, but not all of the alerts will be presented to an auditor. Advantageously, the auditor will continuously be presented with alerts that have a reasonable likelihood of being indicative of malicious activity, thus continuously providing new feedback for the adjustment process of the weight table 1000. In an alternative implementation, but for a similar effect, alerts with various risk scores may be randomly surfaced according to some function (e.g., every 5th (or some other number) alert is given a 50% (or some other number) chance of being shown, regardless of the risk score associated with the alert.

In block 214, if the risk score satisfies the threshold, an alert may be generated. The alert may comprise information about the entity associated with the potentially malicious activity, one or more flags related to the type of malicious activity or the associated entity, the time and type of the potentially malicious activity, and other relevant information (as described herein). If the risk score does not satisfy the threshold, the system may proceed back to block 202 (or another block of flowchart 200) with processing indicators.

In block 216, the alert is then added into an alert queue 158, thus facilitating it being presented to an auditor.

In block 222, the alert history 154 is updated to include the newly issued alert. This facilitates that when an alert is presented to an auditor, the auditor is able to review a history of other, related alerts that may have been created.

Example Method of Alert Presentation and Feedback

Figure 3:
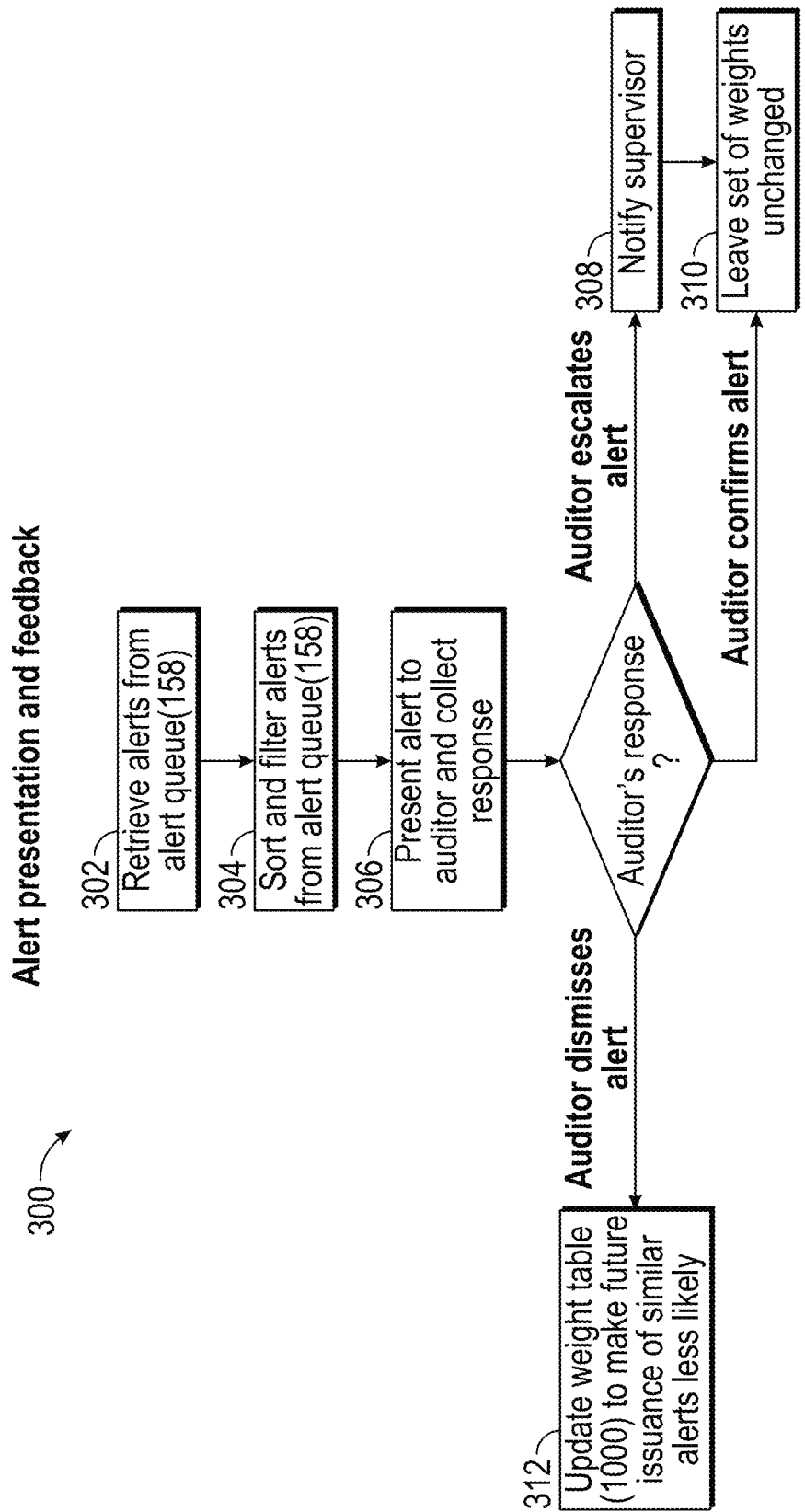
FIG. 3 is a flow chart illustrating an example presentation of alerts to an auditor, and collection of a response, according to an embodiment of the present disclosure.

FIG. 3 is a flowchart of an example method of alert presentation and feedback, according to an embodiment of the present disclosure. In various embodiments, fewer blocks or additional blocks may be included in the process of FIG. 4, or various blocks may be performed in an order different from that shown in the figure. In various implementations, the block of FIG. 4 may be performed serially and/or concurrently, and may be performed multiple times simultaneously. Further, one or more blocks in the figure may be performed by various components of the warning system, for example, monitoring device 150 (described above in reference to FIG. 1).

At block 302, one or more alerts are retrieved from the alert queue 158.

At block 304, the one or more alerts retrieved from the alert queue 158 are grouped, filtered and sorted. The alerts may dynamically be grouped and filtered according to different flags and/or alert types. In an embodiment, the alerts may be sorted by the risk score, for example so as to show the alerts starting with the highest risk score.

At block 306, the alerts, as grouped and filtered, are displayed to the auditor in one or more interactive user interfaces (e.g., as described below in reference to FIGS. 5-7), and a response is received from the auditor. Information or interactive representations associated with the alerts, or the associated indicators may be presented within a user interface presented to the auditor, as described below. For example, the representations may provide visual indications (e.g., graphs or other visualizations) of the indicators related to the alerts and/or groups of alerts. A web server or other type of user interface engine may be configured and/or designed to generate user interface data useable for rendering the interactive user interfaces described herein, such as a web application and/or a dynamic web page displayed within the auditor's device 153. In various embodiments the user interface data may be transmitted to the auditor's device 153, and/or any other computing device, such that the example user interfaces are displayed to the auditor (and/or other users of the system). According to an embodiment, auditors may also assign tasks to themselves or one another via a user interface. Auditors may choose to respond to alerts in a variety of ways, for example by dismissing the alert (e.g., indicating that it was issued in error), by escalating the alert to a supervisor, or by confirming the alert without escalating it to a supervisor.

The warning system moves on to one of blocks 308, 310 or 312 depending on the auditor's response. If the auditor chooses to dismiss the alert, the warning system will adjust the weight table 1000 to reflect the fact that it had issued an alert that should not have been issued. The system will thus reduce the weights of the indicators having contributed to the issuance of the alert and conversely increase those of indicators not having contributed to the alert. If the auditor chooses to confirm the alert, the system moves to block 310, leaving the set of weights unchanged, thus reflecting the auditor's determination that similar alerts should be issued in the future. If the auditor chooses to escalate the alert to a supervisor, the warning system moves to block 308, presenting the alert to a supervisor. The alert may be presented to a supervisor in a similar manner as it was presented to the auditor, or it may be presented through email, text message or other form of communication. After the alert has been presented, the warning system moves to block 310, leaving the set of weights unchanged.

Example Weight Table

FIG. 4 illustrates an example weight table 1000 according to an embodiment of the present disclosure. The weight table comprises a number of weights stored in a row-column format. Each column in the columns 1002 corresponds to an entity role. Different entity roles may be, as illustrated, related of the entity's purpose or task in the organization, such as, for example, software development, legal department or sales. For example, a server running a version control system for source code, or a department of software engineers, would be assigned a role of software development. Conversely, a storage server used for customer and sales data, or an individual employed in the capacity of a sales representative, would be assigned the role "sales". The different entity roles may also be determined and updated based on an entity's assignment to different departments or projects. In the rows 1010, each row corresponds to an indicator. For example, there may be a row for an entity having e-mailed confidential information outside the organization, for an entity having previously violated an organization's policy, or an entity having access to particularly sensitive information. Some indicators, such as illustrated in subset 1014 of the rows 1010, may be qualitative indicators, such as whether an entity has recently been granted additional access privileges, or whether an entity has previously been investigated for malicious activity. Other indicators, such as illustrated in subset 1012 of the rows 1010, may be determined by quantitative comparison against some reference value, such as the number of pages printed or the number of megabytes copied onto removable media exceeding a certain threshold.

At each intersection of a row and a column is a table element that corresponds to the weight of the indicator in its row, when present in an entity having the role indicated in its column. For example, example table element 1020 corresponds to the weight of an entity assigned the role of "Legal Department" having the indicator "Multiple Authentication Failures".

As another example, for an entity in a "software development" role, the weight of the indicator "DLP: Source Code", is 0.015 according to the weight table illustrated. For an entity assigned the "Legal Department" role matching the indicator "DLP: Source Code", the weight is 0.5 according to the weight table illustrated. This may be seen as reflecting an observation that an entity assigned to a software development department occupies a role that involves dealing with source code, while the legal department's role does not normally involve source code; thus, an entity assigned to software development which is transferring source code outside the organization is less likely to be engaged in malicious activity than one assigned to the legal department doing so. In some embodiments, this difference in weights need not be explicitly designed into the system; rather, in some embodiments, the weight matrix (or table) is adjusted in response to an auditor's response to alerts and thus allows the system to learn appropriate weights during operational use.

In various implementations, weights may be assigned to different combinations of indicators and contextual information associated with entities (e.g., contextual information other than entity role). For example, in the weight table 1000 indicators may be matched up with contextual information indicating an entity's level of access to particularly sensitive information, or any other contextual information. For example, an entity that is authorized to access patient data that is subject to protection under data protection laws such as HIPAA may be have designated entries in the weight table 1000 reflecting that fact.

Example Auditor User Interfaces

Figure 5:
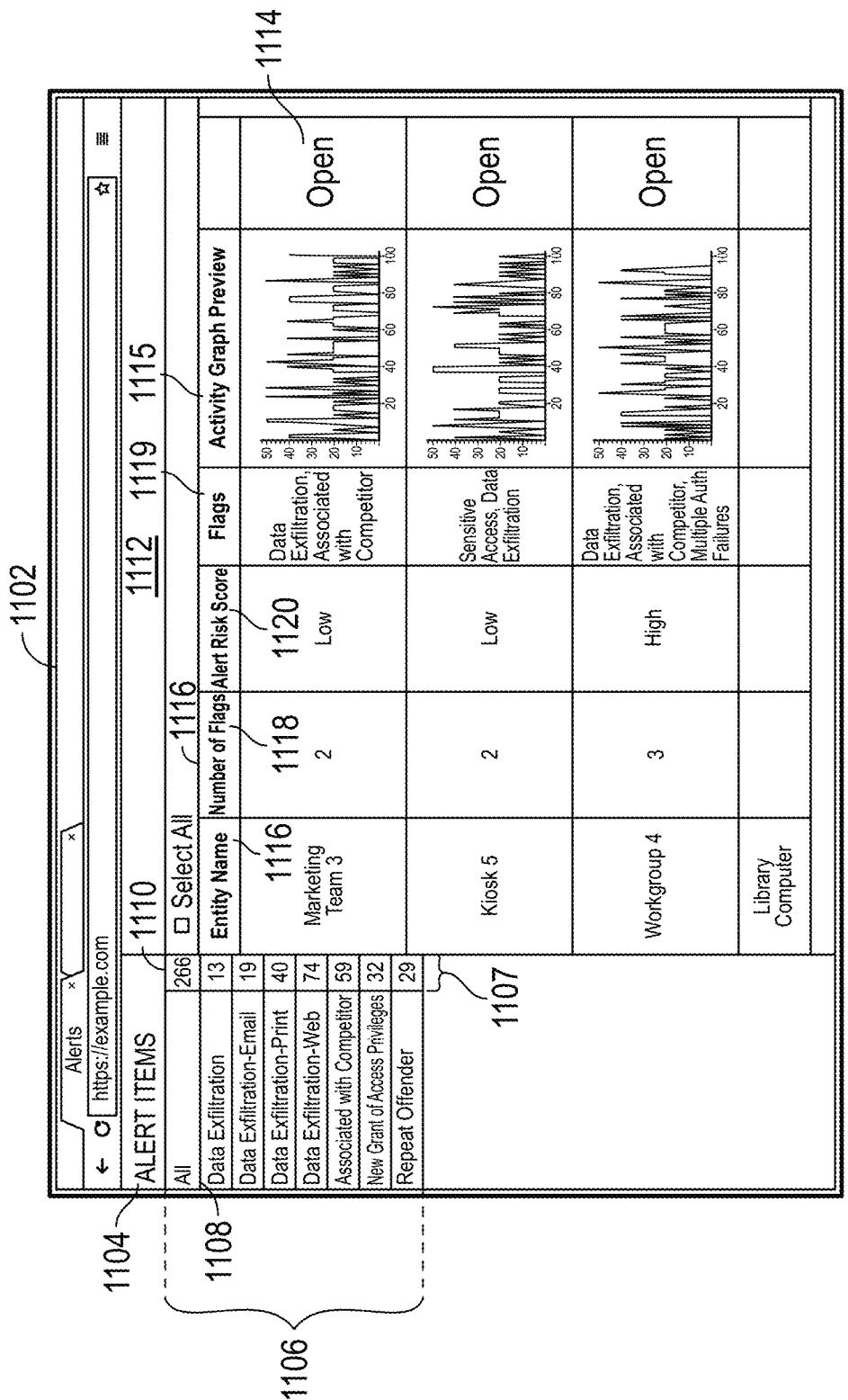
FIG. 5 illustrates an example warning system user interface displaying an alert queue, according to an embodiment of the present disclosure.
Figure 6:
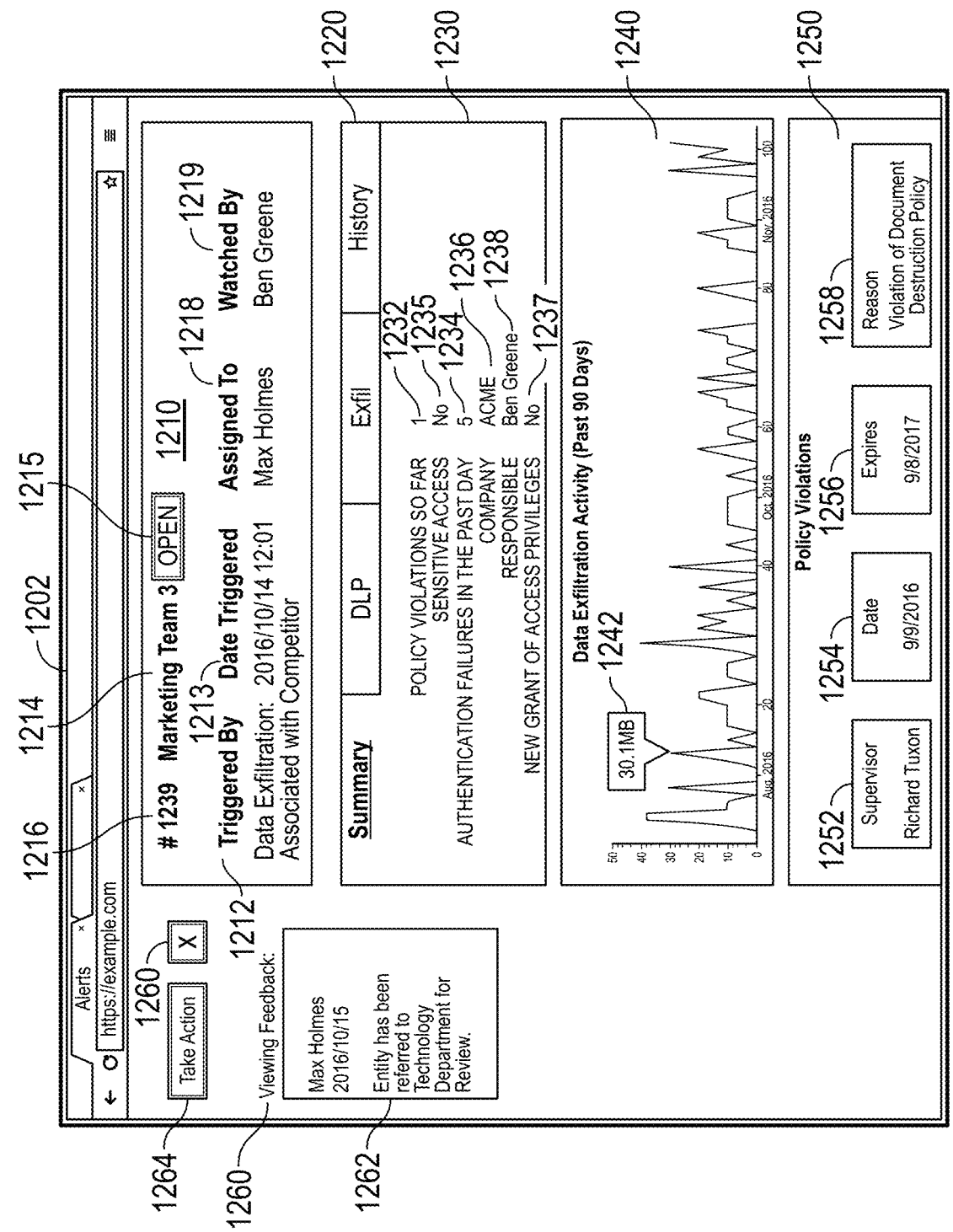
FIG. 6 illustrates an example warning system user interface displaying a summary of information about an alert, according to an embodiment of the present disclosure.

FIGS. 5, 6, and 7, described below, illustrate methods and user interfaces of the warning system, according to various embodiments, in which data points are automatically analyzed and, based on the analysis, alerts are automatically generated and presented to an auditor such that the auditor may quickly and efficiently evaluate the alerts. In particular, as described below the warning system may apply one or more analysis criteria or rules to the indicators (e.g., processing indicators, including user activity information and contextual information) so as to generate a risk score and optionally an alert. The alert may be displayed in an analysis user interface through which the auditor may evaluate them and/or access more detailed data related to the alerts and related indicators. In an embodiment, one or more flags may be associated with each alert, and may be determined based on the indicators related to the alert.

As mentioned above, in an embodiment, the alert score may be binned into one of, for example, three bins corresponding to a high alert, a medium alert, or a low alert. Each alert level may be associated with an indicator, icon, color, and/or the like. For example, a high alert may be associated with red (and/or another color), a medium alert may be associated with orange (and/or another color), and a low alert may be associated grey (and/or another color).

In various embodiments of the example user interfaces described below in reference to FIGS. 5-7, various aspects of the user interfaces may or may not be included, may appear visually different, and/or may be arranged differently.

FIG. 5 illustrates an example user interface 1102 of the system in which an alert queue filled with various alerts is displayed, according to an embodiment. The user interface 1102 includes a panel 1104 including a listing of various flags 1106, as well as count indicators 1107, showing the total number of alerts comprising each of the various flags 1106. Selection of one of the flags 1106 results in a display of indications of associated alerts in the panel 1112. In FIG. 5, selection of "All" 1108 causes display of a combined list of alerts associated with all types of flags in the panel 1112. Indicator 1110 shows a total count of alerts. In the panel 1112, selected information about each displayed alert is presented in a table format, with one alert on each row and a column for each item of information pertaining to the alert. The entity name column 1116 shows the name of the entity having triggered the alert. For an entity that is a server or computer, this may be a host name or IP address. For a department or an individual user, this may be the name of the user or the department. The number of flags column 1118 shows the total number of flags associated with the alert. The flags column 1119 enumerates the flags associated with the alert. The activity graph preview 1115 shows a small ("thumbnail") image of an entity's recent activity associated with data exfiltration. By selecting the activity graph preview 1115, a summary of the corresponding alert, which is discussed in more detail below with reference to FIG. 6, can be accessed, which may comprise an enlarged version of the activity graph shown in the activity graph preview 1115, drawn relative to the same axes. The alert risk score column 1120 shows an indication of the perceived severity of the alert, based on the risk score; for example, the alert risk score column 1120 may show one of "low", "medium" or "high", depending on the risk score. The auditor may cause a detail view to be presented by selecting an "Open" button 1114 next to the alert of interest. The detail view displays additional, more detailed information about a chosen alert. An example of a detail view is illustrated in FIG. 6.

In various implementations, panel 1112 may include more of fewer columns than those shown in the example of FIG. 5. Further, the user may optionally select any portion of each row to view more detailed information associated with an alert. In an implementation, each alert in panel 1112 may include additional user interface elements by which an auditor may take an action with respect to the alert (e.g., escalate, dismiss, confirm, etc.)

FIG. 6 illustrates an example user interface 1202 of the system, in which a detail view of an alert is displayed, according to an embodiment. The user interface 1202 includes a status pane 1210, a page selector 1220, a summary section 1230, an activity graph 1240, a policy violation history section 1250, and a feedback panel 1260.

The status pane 1210 conveys general information about the alert, such as, for example, one or more flags associated with the alert in the "Triggered By" column 1212, the date it was triggered in the "Date Triggered" column 1213, the entity as to whom it was triggered in the "entity" field 1214, a number identifying the alert in the ID field 1216, a name of a person assigned to respond to the alert in the "assigned to" column 1218, the alert status in the status field 1215, and a name of a person watching the alert 1219. The status field 1215 indicates one of several statuses the alert can be in; for example, if the alert has not been responded to yet, the status may be "open"; if the alert has been responded to and found to be a false alert, the status may be "dismissed"; if the alert has been forwarded to a supervisor for further action, the status may be "escalated". This allows the auditor to keep track of which alerts need action, and focus on such alerts.

The page selector 1220 allows the auditor to select one of several collections of information, or "pages", related to the alert. Available pages may include a summary page and a history page. The currently displayed page is indicated by an underline. Other available pages can be displayed by selecting their label. For example, in some embodiments, there may be a "Summary" and a "DLP" page available.

The summary section 1230 includes the name of an individual, such as a server's administrator, a department's supervisor, or a user's manager in the "Responsible" row 1238, a total number of incident's from the entity's policy violation history in the "policy violations" row 1232, whether the entity has access to particularly sensitive information in the sensitive access row 1235, whether the entity has only recently been granted additional access privileges in the "new grant of access privileges" row 1237, the name of an organization associated with the entity in the "company" row 1236, and whether the entity has unsuccessfully attempted to access computer systems in the "authentication failures in the past day" row 1234.

The activity graph 1240 shows the entity's recent levels of potentially malicious activity. For example, the activity graph 1240 may show a total amount of data copied to removable media by the entity, printed and transferred out through the internet. By selecting a point on the activity graph 1240, the auditor can read off the value of the graph at that point. For example, in FIG. 6, the auditor chose to select a point in time between August and September 2016. This causes label 1242 to read the value of the activity graph 1240 graph at this point, indicating that on the selected day, the entity had, in aggregate, transferred 30.1 Megabytes of data outside the control of the organization. Activity graph 1240 is an enlarged, higher-resolution representation of the activity graph shown in the activity graph preview 1115 in FIG. 5.

The Policy Violations section 1250 shows the entity's policy violation history. Each policy violation incident is assigned a row, with various information being displayed in columns. In the supervisor column 1252, the name of a supervisor associated with the policy violation incident is shown. In the date column 1254, the date of the policy violation incident is shown. In the expiration column 1256, the date at which the policy violation incident is purged from the entity's file is shown. In the reason column 1258, a brief description of the policy violation is given.

In the Feedback panel 1260, the auditor is presented with various options to react to the alert, and with various information about how others have reacted to the alert. In the feedback viewing section 1262, actions by other auditors and supervisors related to the alert are summarized. An auditor may also add comments via a feedback box provided in the feedback viewing section 1262 that will be shown to others reviewing that alert, including, for example, other auditors or supervisors. Specifically, an auditor may use the feedback box to include information related to the entity's activity when escalating an alert, thus ensuring that the supervisor reviewing the escalated alert is presented with the contextual information as provided by the warning system as well as any remarks or annotations by the auditor having already reviewed the alert. Advantageously, this allows for more effective information sharing and thus easier collaboration between auditors. The action button 1264 allows the auditor to take action regarding the alert, such as to escalate the alert to a supervisor or to dismiss the alert. The panel dismiss button 1266 allows the auditor to dismiss the feedback panel 1260 to free more space for the remaining User Interface elements.

FIG. 7 is an illustration of another example user interface 1300 of the system, in which history information about an alert is presented, according to an embodiment. In addition to some elements already described with reference to FIG. 6, user interface 1300 comprises a historical incidents section 1310 and a timeline section 1330. The historical incidents section 1310 shows information about prior related alerts in a row-column format. Each type of alert is associated with a row, and various information items related to the type of alert are presented in the columns. In a policy column 1321, the type of policy violation giving rise to the prior alert is described. For example, policy column 1321 may indicate that certain alerts were triggered by an entity's potential violation of the organization's data exfiltration policy related to the use of personal storage media. In an incident count row 1322, the number of alerts related to a potential violation of the policy described in policy column 1321 is described. In an entity pass percentage row 1324, the percentage of this entity's alerts as to that policy that have been reviewed by a supervisor and found not be malicious activity is displayed. In a department pass percentage row 1326, the percentage of this entity's department's alerts as to that policy that have been reviewed by a supervisor and found not be malicious activity is displayed. In a rule pass percentage row 1328, the percentage of the entire organization's incidents as to that policy that have been reviewed by a supervisor and found not be malicious activity is displayed. This form of presentation may be advantageous because it allows the auditor to take into account the entity or the entity's department history for following, or disregarding, the organization's policies.

In the timeline section 1330, information about prior alerts triggered by the entity is displayed in a row-column format. Each row corresponds to one alert. The prior alert date column 1332 indicates the date and time of the prior alert. The detail column 1335 summarizes the indicators having caused the prior alert to trigger.

ADDITIONAL IMPLEMENTATION DETAILS AND EMBODIMENTS

Advantageously, according to various embodiments, the warning system enables more efficient and effective distinguishing of benign activity from malicious activity related to a computer network. Distinguishing of benign activity from malicious activity related to a computer network is difficult, especially because of the large quantity of indicators to be reviewed, and because it may not be possible to conclude whether benign activity or malicious activity is occurring based only on the review of only one, or a subset of, indicators. Embodiments of the present disclosure allow for a warning system to be implemented that gathers the various indicators, processes them using contextual information to determine the risk of malicious activity, and generates alerts where appropriate based on the estimate of risk. The risk estimate can then be used to create alerts for review by a human auditor, and to sort, rank, aggregate and filter the alerts. When alerts are presented to a human auditor, contextual information is presented with the alert. Where appropriate, alerts may be presented using aggregates such as totals, averages and maxima. Alerts are presented in a user interface that incorporates visual representations, such as charts and graphs, where appropriate, to allow the auditor to comfortably review large datasets and to take advantage of humans' particularly strong pattern recognition abilities related to visual stimuli.

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 8:
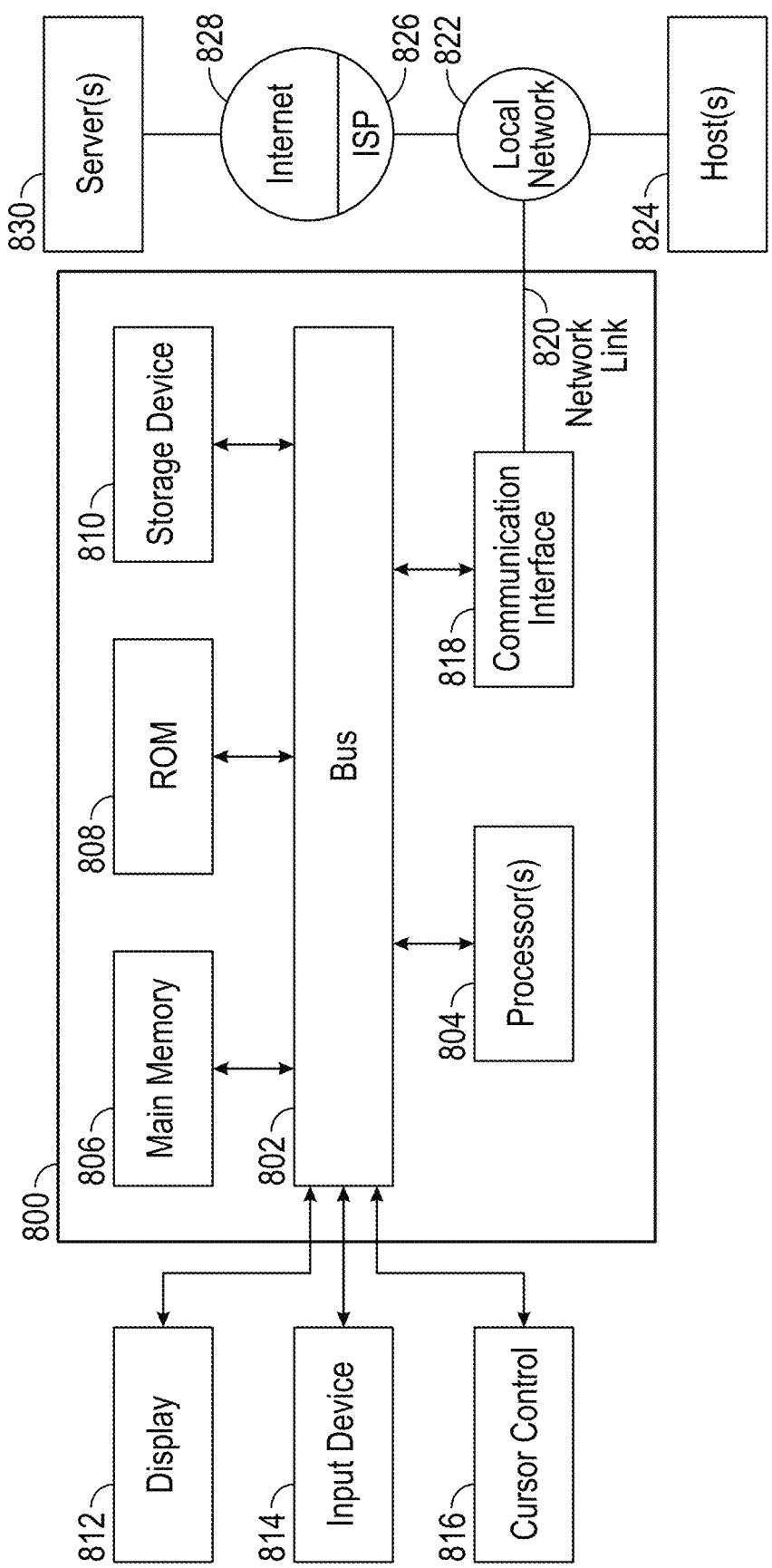
FIG. 8 illustrates a computer system with which certain methods discussed herein may be implemented.

For example, FIG. 8 is a block diagram that illustrates a computer system 800 upon which various embodiments may be implemented. Computer system 800 includes a bus 802 or other communication mechanism for communicating information, and a hardware processor, or multiple processors, 804 coupled with bus 802 for processing information. Hardware processor(s) 804 may be, for example, one or more general purpose microprocessors.

Computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

Computer system 800 may be coupled via bus 802 to a display 812, such as a cathode ray tube (CRT) or LCD display (or touch screen), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 800 may include a user interface module to implement a GUI that may be stored in a mass storage device as computer executable program instructions that are executed by the computing device(s). Computer system 800 may further, as described below, implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more computer readable program instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

Various forms of computer readable storage media may be involved in carrying one or more sequences of one or more computer readable program instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN (or WAN component to communicated with a WAN). Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computing system configured to generate an alert related to malicious activity, the computing system comprising:
   a computer readable storage medium having program instructions embodied therewith; and
   one or more processors configured to execute the program instructions to cause the computing system to:
      receive a plurality of indicators of potentially malicious activity associated with an entity;
      select, based at least in part on contextual information associated with the entity, a set of weights to apply to the plurality of indicators of potentially malicious activity;
      determine, based at least in part on the set of weights and the plurality of indicators, a risk score indicative of a probability of malicious activity of the entity; and
      in response to the risk score satisfying a threshold value, generate an alert.

2. The computing system of claim 1, wherein the contextual information comprises organizational roles, wherein set of weights is selected from a plurality of sets of weights, wherein the plurality of sets of weights are associated with different organizational roles, and wherein the one or more processors are configured to execute the program instructions to further cause the computing system to:
   in response to receiving an input associated with the alert, update the set of weights.

3. The computing system of claim 1, wherein the one or more processors are configured to execute the program instructions to further cause the computing system to:
   store the plurality of sets of weights in a two-dimensional table, extending along a plurality of rows and a plurality of columns, wherein each row in the plurality of rows corresponds to an indicator, and wherein each column in the plurality of columns corresponds to a context of the entity.

4. The computing system of claim 1, wherein the one or more processors are configured to execute the program instructions to further cause the computing system to:
   in response to the risk score not satisfying the threshold, randomly determine whether or not to generate the alert for presentation to a user.

5. The computing system of claim 1, wherein the one or more processors are configured to execute the program instructions to further cause the computing system to:
   generate user interface data configured to be rendered as a user interface including at least:
      an indication of the alert,
      a historic comparison comprising information about one or more similar prior alerts, and
      a graphical representation of activity of the entity.

6. The computing system of claim 5, wherein the one or more processors are configured to execute the program instructions to further cause the computing system to:
   provide a first view of the user interface presenting a plurality of alerts, wherein the first view comprises, for each alert in the plurality of alerts, a first graphical representation of activity of the entity related to the alert;
   receive a selection of a selected alert from the plurality of alerts; and
   provide a second view of the user interface including additional information related to the selected alert, wherein the second view of the user interface includes a second graphical representation of activity of the entity related to the selected alert,
   wherein the second graphical representation represents similar data as the first graphical representation and the second graphical representation is larger in size than the first graphical representation.

7. The computing system of claim 5, wherein the one or more processors are configured to execute the program instructions to further cause the computing system to:
   configure the user interface to present a plurality of alerts, wherein the plurality of alerts are sorted according to respective associated risk scores.

8. The computing system of claim 1, wherein different weights from the set of weights are applied to different corresponding indicators of the plurality of indicators.

9. The computing system of claim 1, wherein the one or more processors are configured to execute the program instructions to further cause the computing system to:
   receive a comment from an auditor corresponding to the alert;
   store the comment in association with the alert; and
   provide the comment when providing the alert for display in a user interface.

10. The computing system of claim 1, wherein the contextual information comprises as least one of: a role of the entity in an organization, a department associated with the entity, an indication whether the entity has been found to previously have engaged in a malicious activity, an indication whether the entity's department has been found to previously have engaged in a malicious activity, an access history of the entity, an indication of an association of the entity with a competitor, an indication whether the entity has unsuccessfully attempted to access a computer resource of the organization, a policy violation of the entity, or an indication of whether the entity is allowed to access a particularly sensitive information.

11. The computing system of claim 1, wherein the alert comprises information that at least partly indicates the contextual information that contributed to the risk score satisfying the threshold value.

12. The computing system of claim 1, wherein the indicators are determined from at least one of: email logs, print logs, proxy logs, Data Loss Prevention logs, operating system logs, web server logs, database server logs, voice over IP server logs, firewall logs, wireless access point logs, or intrusion detection system logs.

13. The system of claim 1, wherein the one or more processors are configured to execute the program instructions to further cause the computing system to:
  update the weights of the set of weights for a future alert based on an auditor's response to the alert.

14. The system of claim 1, the one or more processors are configured to execute the program instructions to further cause the computing system to:
  receive an input in response to the alert; and
  based on the input, perform at least one of: present the alert to a supervisor, mark the alert as dismissed and update the weights for a future alert, or mark the alert as dismissed without updating the weights for a future alert.

15. The system of claim 1, the one or more processors are configured to execute the program instructions to further cause the computing system to:
  receive information related to a prior alert related to the entity;
  determine whether a prior activity related to the prior alert is similar to a suspicious activity;
  determine whether the prior activity has been determined to not be malicious; and
  if the prior activity has been determined not to be malicious, modify the set of weights so as to reduce one or more weights in the set of weights that correspond to the suspicious activity that is similar the prior activity.

16. A method of generating an alert related to malicious activity, the method comprising:
  receiving a plurality of indicators of potentially malicious activity associated with an entity;
  selecting, based at least in part on contextual information associated with the entity, a set of weights to apply to the plurality of indicators of potentially malicious activity;
  determining, based at least in part on the set of weights and the plurality of indicators, a risk score indicative of a probability of malicious activity of the entity; and
  in response to the risk score satisfying a threshold value, generating an alert.

17. The method of claim 16, further comprising:
  in response to receiving an input associated with the alert, update the set of weights, wherein the contextual information comprises organizational roles, and wherein the plurality of sets of weights are associated with different organizational roles.

18. The method of claim 16, further comprising:
  in response to the risk score not satisfying the threshold, randomly determining whether or not to generate the alert for presentation to a user.

19. The method of claim 16, further comprising:
  generating user interface data configured to be rendered as a user interface including at least:
    an indication of the alert,
    a historic comparison comprising information about one or more similar prior alerts, and
    a graphical representation of activity of the entity.

20. The method of claim 19, further comprising:
  providing a first view of the user interface presenting a plurality of alerts, wherein the first view comprises, for each alert in the plurality of alerts, a first graphical representation of activity of the entity related to the alert;
  receiving a selection of a selected alert from the plurality of alerts; and
  providing a second view of the user interface including additional information related to the selected alert, wherein the second view of the user interface includes a second graphical representation of activity of the entity related to the selected alert,
  wherein the second graphical representation represents similar data as the first graphical representation and the second graphical representation is larger in size than the first graphical representation.

* * * * *